United States Patent Office 3,245,875
Patented Apr. 12, 1966

3,245,875
FUNGICIDAL METHOD AND COMPOSITION INVOLVING POLYMERIC THIADIAZINETHIONE COMPOUNDS
Earl W. Cummins, Wilmington, Del., assignor to E. I. du Pont de Nemours and Company, Wilmington, Del., a corporation of Delaware
No Drawing. Original application May 2, 1960, Ser. No. 25,856, now Patent No. 3,126,378, dated Mar. 24, 1964. Divided and this application Dec. 6, 1963, Ser. No. 328,514
2 Claims. (Cl. 167—33)

This application is a divisional application of my co-pending application Serial No. 25,856, filed May 2, 1960, now U.S. Patent 3,126,378.

This invention relates to novel polymeric thiadiazinethiones connected by N-alkylene linkages and terminated with thiadiazinethiones substituted with monovalent substituents on the nitrogen chain participating positions, and fungicidal compositions and methods for using these products for the protection of organic matter subject to fungus infection.

The products of this invention are represented by the following general formula:

(I)

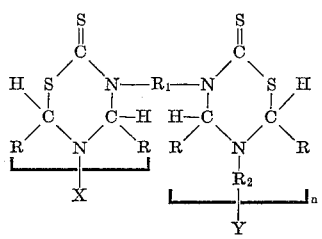

where:

X is $R_3$ and

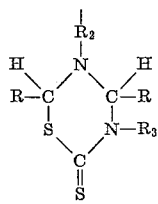

Y is

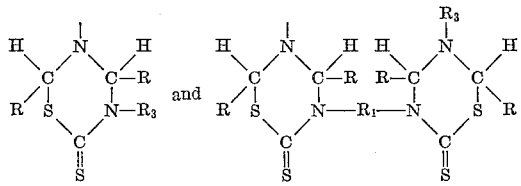

$R_3$ is alkyl or alkenyl of ($C_1$–$C_{18}$); $R_1$ and $R_2$ are same or different from group consisting of alkylene of 2–6 carbon atoms; R is hydrogen and alkyl or alkenyl ($C_1$–$C_3$); and $n$ is a positive whole number.

The stable polymeric thiadiazinethiones and compositions of this invention are effective agents for the protection of organic matter subject to fungus infection as for example prevention of apple scab and tomato blight. Generally, the crude reaction products contain substantial amounts of the polymeric thiadiazinethiones of this invention and are adequate for direct formulation and use as fungicide agents without further purification.

A convenient method for the preparation of the novel polymeric thiadiazinethiones follows: Generally the method involves the addition of an aqueous or aqueous-alcoholic solution of an alkylene diamine or a mixture of alkyl amines and alkylene diamines to an aqueous-alcoholic solution of an alkylenebisdithiocarbamic acid or a mixture of mono and bisdithiocarbamic acids, followed by the immediate addition of an aqueous aldehyde solution. The reaction is generally completed in about 1 to 2 hours under normal atmospheric conditions. The solid reaction mixtures containing substantial quantities of the polymeric thiadiazinethiones of this invention are then removed by filtration, washed with water and dried.

The degree of polymerization can be controlled by varying the ratio of the difunctional reactants (alkylene diamine, alkylenebisdithiocarbamic acids and aldehyde) to the monofunctional reactants (alkyldithiocarbamic acid and/or alkyl amine). The type of polymer obtained is defined by the monofunctional reactants (i.e., the chain terminating reactants) used.

The chain terminating reactants are generally mixed with the alkylene diamine and the alkylenebisdithiocarbamic acid before the addition of the aldehyde. However, in some instances, the addition of the chain terminating reactants may be made simultaneously with the aldehyde throughout the course of the reaction. Unstable long-chain polymeric solids result unless the chain terminating reactants are added at least partially to the chain promoting reactants at the beginning of the reaction; prior to solid precipitation from the reaction medium.

The following subgeneric structures for the thiadiazinethiones of this invention illustrate generally that the polymerization can proceed and can be terminated or "capped" at both ends in three ways by the appropriate use of the monofunctional and difunctional reactants mentioned above.

(a) Alkyl amine moiety at both ends.
(b) H-alkyl dithiocarbamic acid moiety at both ends.
(c) Combination of a and b above.

1 ALKYL N AT BOTH ENDS (II)

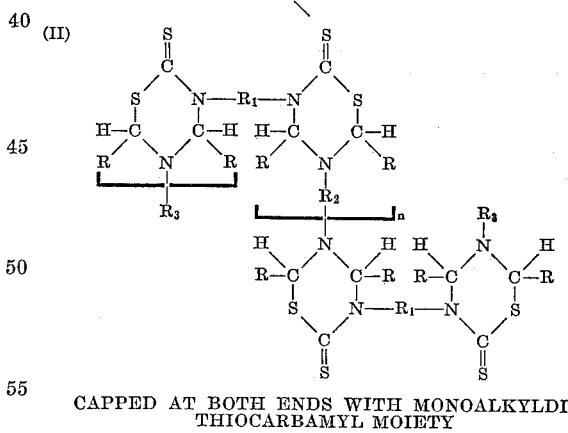

CAPPED AT BOTH ENDS WITH MONOALKYLDITHIOCARBAMYL MOIETY (III)

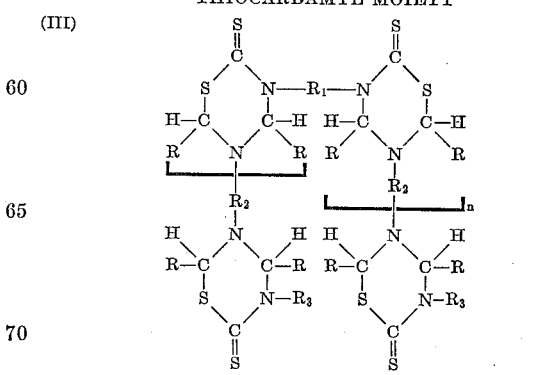

CAPPED WITH ALKYL AMINE AND ALKYL DITHIOCARBAMYL MOIETIES (IV)
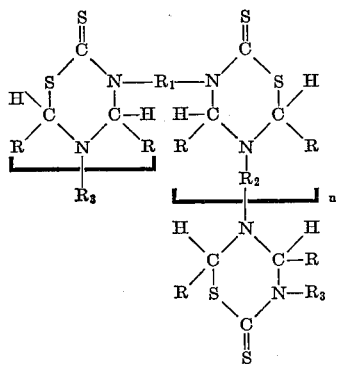

These structures further illustrate that the thiadiazine-thiones of this invention are linked by alkylene groups via their amino and thio amido nitrogens. The ratio of amino alkylene groups to thio amido alkylene groups in a given polymeric product is controlled by the molar ratios of the difunctional reactants used in the reaction. For example, the three types of polymeric thiodiazinethiones of this invention illustrated by formulae II, III, IV above are prepared by reacting the ratios of molar equivalents of the reactants given in Table I below:

TABLE I

| Structural type of polymeric thiadiazinethione | Reactants | Ratios of the molar equivalents of reactants |
|---|---|---|
| II | Alkylenebisdithiocarbamic acid | $n+1$. |
|  | Alkylenediamine | $n$. |
|  | Alkyl or alkenyl amine | 2. |
|  | Aldehyde | $4n+4$. |
| III | Alkylenebisdithiocarbamic acid | $n$. |
|  | Alkylenediamine | $n+1$. |
|  | Alkyl or alkenyl dithiocarbamic acid | 2. |
|  | Aldehyde | $4n+4$. |
| IV | Alkylenebisdithiocarbamic acid | $n$. |
|  | Alkylenediamine | $n$. |
|  | Alkyl or alkenyl dithiocarbamic acid | 1. |
|  | Alkyl or alkenyl amine | 1. |
|  | Aldehyde | $4n+2$. |

Note than $n$ of Formulae II, III, and IV above which defines the extent of polymerization and the $n$ times the molar equivalents of the reactants listed in Table I are interrelated and numerically the same. For example when $n=3$ in Table I, the corresponding polymeric thiadiazinethione II, III, or IV containing 3 repeating units ($n=3$) are formed in substantial quantities.

The conditions of the reactions, for example, the exact temperature employed, the amount and type of solvent for the reactants, the rate of addition of the aldehyde, the concentration of the reactant solutions etc., will be dependent on the reactants employed and the extent of polymerization desired.

The fungicidal polymeric thiodiazinethiones of this invention are in general white solids having melting points in the range of 60°–200° C. They are essentially insoluble in water and alcohols.

In practicing the fungicidal methods of my invention, one or more of the active ingredients is applied to the organic material to be treated for the control of fungi at a dosage sufficient to exert fungicidal action. Accordingly, my compositions and methods are applicable for the protection of carbohydrates, proteins and fats. They are particularly suited for the treating of living plant life such as vegetables, ornamental plants and fruit-bearing trees. Also they can be used to treat organic fibers and fabrics, leather and various cellulosic materials such as wood. Likewise they can be used to treat paints and lubricating oils.

In application to plants, fungicidal control is obtained in most instances by applying the active compound at a dosage or rate from about 1 to 10 pounds per acre, the optimum amount within this range being largely dependent upon the variables mentioned hereafter. It is, of course, determined by and dependent upon the particular fungicidal compound selected, the method of application, and, in the case of application to vegetation, the state and condition of growth of the vegetation to be treated, and the climatic conditions.

The fungicidal compositions of my invention contain in sufficient amount to exert fungicidal action one or more of the above-described active compounds in admixture with a carrier material or conditioning agent of the kind used and commonly referred to in the art as a fungicide adjuvant or modifier. The conventional fungicide adjuvants are inert solids, hydrocarbon liquid diluents and surface-active agents. They provide formulations adapted for ready and efficient application using conventional applicator equipment. Usually from about 1 to 95% by weight of the fungicidal composition is active ingredient.

Solid compositions are preferably in the form of powders. They are compounded to be homogeneous powders that can be either used as such, diluted with inert solids to form dusts, or suspended in a suitable liquid medium for spray application. The powders usually comprise active ingredient admixed with minor amounts of conditioning agent. Natural clays, either adsorptive such as attapulgite or relative non-absorptive such as kaolin clays, diatomaceous earth, walnut shell flour, tobacco dust, redwood flour, synthetic fine silica, calcium silicate and other inert solid carriers of the kind conventionally employed in powder fungicidal compositions can be used. The active ingredient usually makes up from about 25 to 80% of these powder compositions. For conversion of the powders to dusts, talc, pyrophyllite, tobacco dust, volcanic ash and other dense, rapid-settling inert solids customarily are used.

Liquid compositions employing one or more of the fungicidally-active ingredients are prepared by admixing the active ingredient with a suitable liquid diluent medium. The active ingredient can be either in solution or in suspension in the liquid medium. Typically of the liquid media commonly employed as fungicide adjuvants are kerosene, Stoddard solvent, xylene, alcohols, alkylated naphthalene and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates and other surface-active agents. A detailed list of such agents is set forth in an article by McCutcheon, entitled "Synthetic Detergents and Emulsifiers," volume 31, 1955, of "Soap and Chemical Specialties."

In some cases it may be desirable to employ the active compounds of the present invention in combination with other fungicides to give compositions that have broad spectrum fungicidal activity. In these mixtures, the fungicidally active materials can be present in any desired amount, ordinarily from about 0.1–20 parts by weight of a compound represented by Formula I per part by weight of the auxiliary fungicidally active material. In some instances it may even be desirable to employ two or more auxiliary fungicides.

Typical of the auxiliary fungicides that can be employed in combination with the compounds of the present invention are the following:

N-trichloro-methylthio-4-cyclohexene-1,2-dicarboximide
Tetramethylthiuram disulfide
Manganese ethylene-bis-dithiocarbamate
Ferric dimethyl dithiocarbamate
Zinc ethylene-bis-dithiocarbamate
Zinc dimethyl dithiocarbamate (ziram)
Tetra copper calcium oxychloride
Tetrachloro-p-benzoquinone (chloranil)
2,3-dichloro-1,4-naphthoquinone (dichlone)
2-dichloro-6-(o-chloroanilino)triazine (dyrene)
Ethylene thiuram monosulfide
2-heptadecyl glyoxalidine acetate (glyodin)
Ferric dimethyl dithiocarbamate plus 2-mercaptobenzothiazole tative yield of the stable, solid 5,5-[(tetrahydro-2-thiono-2H - 1,3,5 - thiadiazin-3,5-ylene)diethylene]bis(tetrahydro-3-methyl-2H-1,3,5-thiadiazine-2-thione) is isolated by filtration. After washing with water and drying, it is adequate for formulation and fungicidal application without further purification.

Other polymeric thiadiazinethiones of this invention having the subgeneric structure IV shown above can be prepared similarly by substituting equivalent molar quantities of the reactants listed in Table II below for the reactants of Example 1 above. Multiples of the equivalent molar quantities of the difunctional reactants gives polymeric thiadiazinethiones of structure IV where $n$ is greater than 1. For the purpose of clarity structural description of the products obtained are listed in Table II below rather than the language used to name the product obtained in Example 1 above.

TABLE II

| Reactants | | | | | | Products obtained of subgeneric structure IV where R, $R_1$, $R_2$, $R_3$ are— | | | | | |
|---|---|---|---|---|---|---|---|---|---|---|---|
| Ex. No. | di-HCl salt of diamine | HCl salt of amine | Aldehyde | Alkyl(Na+) dithiocarbamic acid | Alkylenebis-dithiocarbamic acid 2Na+ salt | Alkyl | R | $R_1$ | $R_2$ | $R_3$ | n |
| 2 | Ethylene diamine | Methylamine | Formaldehyde | Ethyl | Ethylene | Methyl | H | Ethylene | Ethylene | Ethyl | 1 |
| 3 | do | Isopropyl | do | Isopropyl | do | Isopropyl | H | do | do | Isopropyl | 1 |
| 4 | do | Methyl | do | Hexyl | do | do | H | do | do | Hexyl | 1 |
| 5 | do | do | do | Lauryl | do | do | H | do | do | Lauryl | 1 |
| 6 | do | Ethylamine | do | Methyl | do | Ethyl | H | do | do | Methyl | 1 |
| 7 | do | n-Butylamine | do | Isobutyl | do | n-Butyl | H | do | do | Isobutyl | 1 |
| 8 | do | Allylamine | do | Allyl | do | Allyl | H | do | do | Allyl | 1 |
| 9 | do | Amyl | Acetaldehyde | Octadecyl | do | Amyl | Methyl | do | do | Octadecyl | 1 |
| 10 | do | Tert octyl | do | Methyl | do | Tert octyl | do | do | do | Methyl | 1 |
| 11 | do | Allyl | Propionaldehyde | do | do | Allyl | Ethyl | do | do | do | 1 |
| 12 | do | Methyl | Butyraldehyde | do | do | Methyl | Butyl | do | do | do | 1 |
| 13 | Trimethylene | do | Formaldehyde | do | do | do | H | do | Propylene | do | 1 |
| 14 | Ethylene | n-Propyl | Acrolein | Tert. octyl | Hexamethylene | n-Propyl | Vinyl | Hexamethylene | Ethylene | Tert. octyl | 1 |
| 15 | Hexamethylene | Methyl | Crotonic | Methyl | do | Methyl | Methyl vinyl | do | Hexamethylene | Methyl | 1 |
| 16 | Tetramethylene | Lauryl | Formaldehyde | Heptyl | Pentamethylene | Lauryl | H | Pentamethylene | Tetramethylene | Heptyl | 1 |
| 17 | Ethylene | Methyl | do | Methyl | Ethylene | Methyl | H | Ethylene | Ethylene | Methyl | 2 |
| 18 | do | do | do | do | do | do | H | do | do | do | 3 |
| 19 | do | do | Acrolein | do | do | do | Vinyl | do | do | do | 4 |
| 20 | Trimethylene | Tert. butyl | Butyraldehyde | n-Butyl | Trimethylene | Tert. butyl | Propyl | Trimethylene | Trimethylene | n-Butyl | 7 |
| 21 | Ethylene | Methyl | Formaldehyde | Methyl | Ethylene | Methyl | H | Ethylene | Ethylene | Methyl | 10 |

Manganese dimethyl dithiocarbamate plus 2-mercaptobenzothiazole
Copper dihydrazinium sulfate
Copper-8-quinolinolate
Cycloheximide
Terramycin
Streptomycin Compounds disclosed in my copending application Serial No. 809,597, filed April 29, 1959, now abandoned.

In order that the invention may be better understood, the following examples are given:

PREPARATIVE EXAMPLES

Example 1

A solution containing 1500 pts. by wt. of water, 256 pts. by wt. of ethylenebisdithiocarbamic acid, disodium salt and 129 pts. by wt. of methyl dithiocarbamic acid, sodium salt is added rapidly at room temperature to a stirring solution containing 1000 pts. by wt. of water, 133 pts. by wt. of ethylenediamine dihydrochloride and 67.5 pts. by wt. of methylamine hydrochloride followed immediately by the rapid addition of 600 pts. by wt. of a 30% aqueous solution of formaldehyde. The entire reaction is stirred for two hours. An essentially quanti-

Example 22

A solution of 135 pts. by wt. of methylamine hydrochloride and 133 pts. by wt. of ethylenediamine dihydrochloride in 660 pts. by wt. of water was added rapidly to a stirred solution of 512 pts. by wt. of ethylenebisdithiocarbamic acid disodium salt in 4000 pts. by wt. of water. In rapid succession, 650 pts. by wt. of a 36.9% aqueous formaldehyde solution was also added rapidly to the reaction. After a short induction period, solid precipitated. Continued stirring for two additional hours completed the reaction. The solid was removed by filtration, washed was water and dried to give 527 pts. by wt. of 3,3'-ethylenebis[(tetrahydro - 2 - thiono - 2H - 1,3,5 - thiadiazin-3,5 - ylene)diethylene]bis(tetrahydro - 5 - methyl - 2H-1,3,5-thiadiazine-2-thione), as a pale yellow solid, M.P. 156°–164° C.

Other polymeric thiadiazinethiones of this invention having the subgeneric structure II shown above can be prepared similarly by substituting equivalent molar quantities of the reactants listed in Table III below for the reactants of Example 22 above. Multiples of the equivalent quantities of the difunctional reactants as shown in Table I gives the polymeric thiadiazinethiones of structure II where $n$ is greater than one. For the purposes of clarity and understanding, structural identification of the products obtained are listed in Table III below:

with water to give a 0.2% concentration of the active ingredient. The resultant composition, when sprayed on

TABLE III

| | Reactants | | | | Products obtained of subgeneric structure II where R, $R_1$, $R_2$, $R_3$, are: | | | | |
|---|---|---|---|---|---|---|---|---|---|
| Ex. No. | di-HCl salt of diamine | HCl salt of the amine | Aldehyde | Alkylenebisdithiocarbamic acid, 2 2Na+salt | R | $R_1$ | $R_2$ | $R_3$ | $n$ |
| 23 | Ethylene | Ethyl | Formaldehyde | Ethylene | H | Ethylene | Ethylene | Ethyl | 1 |
| 24 | ...do... | Allyl | ...do... | ...do... | H | ...do... | ...do... | Allyl | 1 |
| 25 | ...do... | Butyl | Acetoldehyde | ...do... | Methyl | ...do... | ...do... | Butyl | 1 |
| 26 | ...do... | Hexyl | Propionoldehyde | ...do... | Ethyl | ...do... | ...do... | Hexyl | 1 |
| 27 | Trimethylene | Isopropyl | Butyraldehyde | ...do... | Propyl | ...do... | Trimethylene | Isopropyl | 1 |
| 28 | Hexamethylene | Lauryl | Crotonic | 1,2-propylene | Methylvinyl | 1,2-propylene | Hexamethylene | Lauryl | 1 |
| 29 | 1,2-butylene | Methyl | Butyraldehyde | Isobutylene | Propyl | Isobutylene | 1,2-butylene | Methyl | 1 |
| 30 | Ethylene | Octadecyl | Acrolein | Hexamethylene | Vinyl | Hexamethylene | Ethylene | Octadecyl | 1 |
| 31 | Pentamethylene | Amyl | Formaldehyde | Ethylene | H | Ethylene | Pentamethylene | Amyl | 2 |
| 32 | Ethylene | Methyl | ...do... | ...do... | H | ...do... | Ethylene | Methyl | 5 |
| 33 | ...do... | ...do... | ...do... | ...do... | H | ...do... | ...do... | ...do... | 6 |
| 34 | ...do... | ...do... | ...do... | ...do... | H | ...do... | ...do... | ...do... | 7 |
| 35 | Tetramethylene | Heptyl | Acetaldehyde | Trimethylene | H | Trimethylene | Tetramethylene | Heptyl | 3 |
| 36 | ...do... | Propyl | Propionaldehyde | Ethylene | Ethyl | Ethylene | ...do... | Propyl | 8 |

*Example 37*

A solution of 266 pts. by wt. of ethylene diamine dihydrochloride contained in 600 pts. by wt. of water was added to a stirring aqueous solution of 256 pts. by wt. of ethylenebisdithiocarbamic acid, disodium salt and 258 pts. by wt. of N-methyldithiocarbamic acid, sodium salt in 4000 pts. by wt. of water, followed in rapid succession by the addition of 650 pts. by wt. of a 36.9% aqueous formaldehyde solution. Continued stirring of the reaction mixture at room temperature completed the reaction in two hours. The solid was removed by filtration washed with water and dried to give 5,5'-ethylenebis[(tetrahydro - 2 - thione - 2H - 1,3,5 - thiadiazin-3,5-ylene)diethylene]bis(tetrahydro - 3 - methyl - 2H - 1,3,5-thiadiazine-2-thione).

Other polymeric thiadiazinethiones of this invention having the subgeneric structure III shown above can be prepared similarly by substituting equivalent molar quantities of the reactants listed in Table IV below for the reactants of Example 37 above. Multiples of the equivalent quantities of the difunctional reactants as shown in Table I react to give the polymeric thiadiazine.

tomato foliage, substantially prevents infection by early blight (*Alternaria solani*).

| | Percent |
|---|---|
| 5,5'-[(tetrahydro - 2 - thiono - 2H - 1,3,5 - thiadiazin - 3,5 - ylene)diethylene]bis(tetrahydro - 3 - methyl - 2H - 1,3,5 - thiadiazine - 2 - thione) | 50 |
| Sodium lauryl sulfate | 0.5 |
| Sodium lignin sulfonate | 1.0 |
| Kaolin clay | 48.5 |

*Example 52*

The following wettable powder when dispersed in water at a concentration of 2 pounds per 100 gallons of water and sprayed on tomato foliage at a rate of 100 gallons per acre, prevents early blight (*Alternaria solani*).

| | Percent |
|---|---|
| 3,3' - ethylenebis[(tetrahydro - 2 - thiono-2H-1,3,5-thiadiazin-3,5-ylene)diethylene]bistetrahydro - 5 - methyl - 2H - 1,3,5 - thiadiazine-2-thione) | 80.0 |
| Alkylnaphthalene sulfonic acid solium salt | 0.75 |
| Low viscosity methyl cellulose | 0.25 |
| Silica | 19.0 |

TABLE IV

| | Reactants | | | | Products Obtained of Subgeneric Structure III where R, $R_1$, $R_2$, $R_3$ are: | | | | |
|---|---|---|---|---|---|---|---|---|---|
| Ex. No. | di-HCl salt of diamine | Aldehyde | Mono- dithiocarbamic acid, Na+ | Alkylenebisdithiocarbamic acid, 2Na+ salt | R | $R_1$ | $R_2$ | $R_3$ | $n$ |
| 38 | Ethylene | Formaldehyde | Ethyl | Ethylene | H | Ethylene | Ethylene | Ethyl | 1 |
| 39 | ...do... | Acetaldehyde | Propyl | Tetramethylene | Metnyl | Tetramethylene | ...do... | Propyl | 1 |
| 40 | Tetramethylene | Crotonic | Allyl | Ethylene | Methylvinyl | Ethylene | Tetramethylene | Allyl | 1 |
| 41 | Hexamethylene | Formaldehyde | Methyl | Hexamethylene | H | Hexamethylene | Hexamethylene | Methyl | 1 |
| 42 | Ethylene | Butyraldehyde | Lauryl | Ethylene | Propyl | Ethylene | Ethylene | Lauryl | 1 |
| 43 | ...do... | Acrolein | Methyl | ...do... | Vinyl | ...do... | ...do... | Methyl | 1 |
| 44 | Trimethylene | Isobutyraldehyde | Heptyl | Isobutylene | Isopropyl | Isobutylene | Trimethylene | Heptyl | 1 |
| 45 | Ethylene | Formaldehyde | Methyl | Ethylene | H | Ethylene | Ethylene | Methyl | 10 |
| 46 | ...do... | ...do... | ...do... | ...do... | H | ...do... | ...do... | ...do... | 15 |
| 47 | ...do... | ...do... | ...do... | ...do... | H | ...do... | ...do... | ...do... | 22 |
| 48 | ...do... | Acetaldehyde | Butyl | ...do... | Methyl | ...do... | ...do... | Butyl | 5 |
| 49 | Pentamethylene | Propionaldehyde | Amyl | ...do... | Ethyl | ...do... | Pentamethylene | Amyl | 6 |
| 50 | Ethylene | Formaldehyde | Decyl | ...do... | H | ...do... | Ethylene | Decyl | 3 |

The following examples further illustrate the fungicidal activity of the polymeric products of this invention:

*Example 51*

The following wettable powder composition is diluted

*Example 53*

A fungicidal dust composition of 5,5'-ethylenebis-[(tetrahydro-2-thiono - 2H - 1,3,5-thiadiazin-3,5-ylene) diethylene]bis(tetrahydro-3-methyl - 2H - 1,3,5 - thiadiazine - 2 - thione) is prepared. When dusted on bean plants at the rate of 10 pounds of active ingredient per acre, bean rust (*Uromyces appendiculatus*) is controlled.

| | Percent |
|---|---|
| 5,5'-ethylenebis[(tetrahydro - 2 - thiono - 2H - 1,3,5-thiadiazin - 3,5 - ylene)diethylene]bis(tetrahydro-3-methyl - 2H - 1,3,5 - thiadiazine - 2 - thione) | 20.0 |
| Stearated calcium carbonate | 80.0 |

Example 54

Poly - 3,3' - ethylenebis[(tetrahydro - 2 - thiono - 2H-1,3,5 - thiadiazin - 3,5 - ylene)diethylene]bis(tetrahydro-5 - methyl - 2H - 1,3,5-thiadiazine - 2 - thione) is applied to tomato foliage as an aqueous dispersion at a concentration of 0.2%. When the spray deposit dries, the foliage is inoculated with the spores of the early blight fungus (*Alternaria solani*). After a suitable incubation time the leaves are examined for disease. It is found that the treated leaves have very little infection while the untreated control leaves have 100% disease.

The same compound is applied to bean plants as an aqueous suspension at a concentration of 0.008%. When the spray deposit has dried, the plants are exposed to infection by the spores of bean rust (*Uromyces appendiculatus*). After a suitable incubation period it is found that the treated plants have very little infection whereas the untreated control plants have 100% infection.

Example 55

This compound is formulated as a dust that is suitable for application by means of conventional dusting equipment by blending the active and minor diluents together and passing them through a micropulverizer, then blending the product with the major diluent in a ribbon blender.

| | Percent |
|---|---|
| 5,5'-[(tetrahydro-2-thiono-2H - 1,3,5-thiadiazin-3,5-ylene)diethylene]bis(tetrahydro - 3 - allyl - 2H-1,3,5-thiadiazine-2-thione) | 25.0 |
| Pyrophyllite | 69.0 |
| Attapulgite | 6.0 |

This fungicidal composition, when dusted on tomato plants at a rate of 3 pounds per acre of active ingredient prevents infection by early blight (*Alternaria solani*).

Example 56

Example 41 previously cited is formulated as a fungicidal dust having the following composition:

| | Percent |
|---|---|
| 5,5'-hexamethylenebis[(tetrahydro - 2 - thiono-2H-1,3,5-thiadiazin-3,5-ylene)dihexamethylene] - bis tetrahydro-3-methyl-2H - 1,3,5 - thiadiazine-2-thione) (Ex. 41) | 20.0 |
| Tobacco dust | 80.0 |

This fungicidal dust is prepared by blending the listed ingredients and passing them through a micropulverizer. When the composition is dusted on pear trees at the rate of 10 pounds per acre of actual ingredient, it is found to prevent pear scab (*Venturia pyrina*).

Example 57

3,3'-ethylenebis[(tetrahydro - 2 - thiono-2H-1,3,5-thiadiazin-3,5-ylene)diethylene]bis(tetrahydro - 5 - ethyl-2H-1,3,5-thiadiazine-2-thione) is formulated to a wettable powder fungicidal composition by blending the list of ingredients together and passing them twice through a micropulverizer. The resulting powder disperses readily in water to yield a fungicidal spray composition.

| | Percent |
|---|---|
| Ex. 23 (named above) | 80.0 |
| Alkylnaphthalene sulfonic acid, sodium salt | 0.75 |
| Low viscosity methyl cellulose | 0.25 |
| Silica | 19.0 |

Example 58

A wettable powder of the following composition is prepared.

| | |
|---|---|
| 5,5'-[(tetrahydro-2-thiono-2H-1,3,5-thiadiazin - 3,5-ylene)diethylene]bis(tetrahydro-3-isopropyl-2H-1,3,5-thiadiazine-2-thione) | 80.0 |
| Alkylnaphthalene sulfonic acid, sodium salt | 0.75 |
| Low viscosity methyl cellulose | 0.25 |
| Diatomaceous earth | 19.0 |

This wettable powder, when dispersed in water at a concentration of 2 pounds per 100 gallons of water and sprayed on apple trees at the rate of 100 gallons per acre prevents infection by apple scab (*Venturia inaequalis*).

Example 59

| | Percent |
|---|---|
| Poly-(5,5' - ethylenebis[(tetrahydro-2-thiono - 2H-1,3,5-thiadiazin-3,5 - ylene)diethylene]bis(tetrahydro-3-methyl-2H-1,3,5-thiadiazine-2 - thione) | 30.0 |
| Octyl alcohol | 0.005 |
| Sodium lignin sulfonate | 15.0 |
| Hydrated attapulgite | 1.75 |
| Water | 53.45 |

The above materials are mixed together and ground with suitable milling equipment, e.g., a pebble mill or sand mill, until the active material is substantially all below 5 microns in particle size. The resultant, stable, aqueous dispersion may then be diluted with water to suitable spray concentration. When sprayed on tomato foliage at the rate of 300 gallons per acre, early blight is prevented (*Alternaria solani*).

I claim:
1. The method for the control of fungus attack of organic material comprising applying to the organic material to be protected a fungicidally effective amount of a compound of the formula

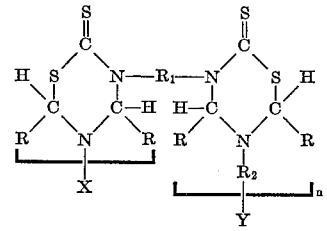

where X is selected from the group consisting of $R_3$ and

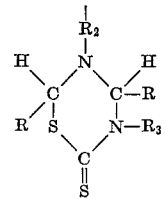

Y is selected from the group consisting of

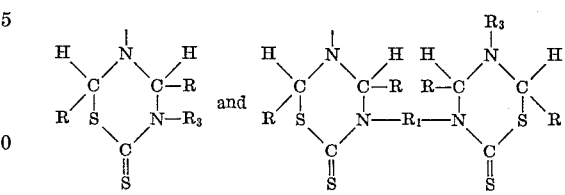

R is selected from the group consisting of hydrogen, alkyl of 1 through 3 carbons, and alkenyl of 1 through 3 carbons; $R_1$ and $R_2$ are alkylene of 2 through 6 carbons; $R_3$ is selected from the group consisting of hydrogen, alkyl of 1 through 18 carbons and alkenyl of 1 through 18 carbons; and $n$ is a positive whole number.

2. A composition comprising a fungicidal amount of a compound as defined in claim 1 and a major amount of an inert solid particulate diluent.

References Cited by the Examiner

UNITED STATES PATENTS 3,085,046  4/1963  Cummins _____ 167—33

JULIAN S. LEVITT, *Primary Examiner.*

FRANK CACCIAPAGLIA, JR., *Examiner.*